US010941615B2

United States Patent
Faller et al.

(10) Patent No.: US 10,941,615 B2
(45) Date of Patent: *Mar. 9, 2021

(54) NOISE DAMPENING MOTOR DRIVE SYSTEM FOR RETRACTABLE COVERING FOR ARCHITECTURAL OPENINGS

(71) Applicant: Hunter Douglas, Inc., Pearl River, NY (US)

(72) Inventors: Kenneth M. Faller, Thornton, CO (US); Ronald Holt, Westminster, CO (US); Stephen T. Wisecup, Niwot, CO (US)

(73) Assignee: Hunter Douglas, Inc., Pearl River, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/918,811

(22) Filed: Mar. 12, 2018

(65) Prior Publication Data
US 2018/0202228 A1    Jul. 19, 2018

Related U.S. Application Data

(63) Continuation of application No. 15/231,163, filed on Aug. 8, 2016, now Pat. No. 9,926,741, which is a
(Continued)

(51) Int. Cl.
*E06B 9/72* (2006.01)
*E06B 9/322* (2006.01)
(Continued)

(52) U.S. Cl.
CPC ............... *E06B 9/72* (2013.01); *E06B 9/264* (2013.01); *E06B 9/322* (2013.01); *E06B 9/40* (2013.01); *E06B 9/50* (2013.01); *H02K 5/24* (2013.01)

(58) Field of Classification Search
CPC ... E06B 9/72; E06B 9/322; E06B 9/40; E06B 9/54; E06B 2009/6809; E06B 9/68; H02K 5/24
See application file for complete search history.

(56) References Cited

U.S. PATENT DOCUMENTS 1,678,590 A    7/1928  Dixson
1,733,176 A    10/1929 Winter
(Continued)

FOREIGN PATENT DOCUMENTS

AU    622268    9/1991
CA    1301052   5/1992
(Continued)

OTHER PUBLICATIONS

United States Patent and Trademark Office, "Non-Final Office Action," issued in connection with U.S. Appl. No. 15/231,163, dated May 31, 2017, 12 pages.
(Continued)

*Primary Examiner* — Daniel P Cahn
*Assistant Examiner* — Jeremy C Ramsey
(74) *Attorney, Agent, or Firm* — Kilpatrick Townsend & Stockton LLP

(57) ABSTRACT

A motor-drive system for retractable covering having a headrail with a horizontally disposed roller supporting a top edge of a flexible fabric material includes an electric motor mounted within a housing and interconnected to the roller to selectively rotate the roller in opposite directions while minimizing noise created from vibrations within the system. This system includes motor mounts within the housing which separate and absorb vibrations of the motor within the housing and a drive disk of a moderately soft material, which is firm enough to transfer torque from the motor to the roller while being soft enough to absorb vibrations which
(Continued)

would otherwise be transmitted from the motor to the roller. An interconnect mounting the drive disk to the drive shaft of the motor is also made of a third relatively soft material, which is harder than the drive disk to more ably transmit torque but soft enough so as not to unduly transmit noise.

20 Claims, 11 Drawing Sheets

Related U.S. Application Data continuation of application No. 13/675,539, filed on Nov. 13, 2012, now Pat. No. 9,410,371, which is a continuation of application No. 12/685,927, filed on Jan. 12, 2010, now Pat. No. 8,307,878.

(60) Provisional application No. 61/144,467, filed on Jan. 14, 2009.

(51) Int. Cl.
  *E06B 9/50* (2006.01)
  *E06B 9/40* (2006.01)
  *E06B 9/264* (2006.01)
  *H02K 5/24* (2006.01)

(56) References Cited

U.S. PATENT DOCUMENTS

| | | |
|---|---|---|
| 1,938,729 A | 12/1933 | Traut |
| 2,124,037 A | 7/1938 | Lavigne |
| 2,540,742 A | 2/1951 | Langer |
| 2,674,306 A | 4/1954 | Prieto |
| 2,722,273 A | 11/1955 | Taylor |
| 2,842,198 A | 7/1958 | Prieto |
| 3,030,535 A | 4/1962 | Wiesner |
| 3,308,873 A | 3/1967 | Dotto |
| 3,310,099 A | 3/1967 | Hunter et al. |
| 3,340,835 A | 9/1967 | Cook et al. |
| 3,451,639 A * | 6/1969 | Atwood ............ B65H 75/28 242/118.32 |
| 3,459,978 A | 8/1969 | Trucks et al. |
| 3,809,143 A | 5/1974 | Ipekgil |
| 4,030,567 A | 6/1977 | Kondo |
| 4,159,162 A | 6/1979 | Christoffel |
| 4,171,845 A | 10/1979 | Hirsch |
| 4,178,955 A | 12/1979 | Dau |
| 4,417,185 A | 11/1983 | Bullat |
| 4,471,248 A | 9/1984 | Smetana |
| 4,535,830 A | 8/1985 | Appel et al. |
| 4,615,371 A | 10/1986 | Clauss |
| 4,623,812 A | 11/1986 | van de Griend |
| 4,663,575 A | 5/1987 | Juzswik et al. |
| 4,766,941 A | 8/1988 | Sloop et al. |
| 4,768,925 A | 9/1988 | Geupel |
| 4,827,199 A | 5/1989 | Kaucic et al. |
| 4,843,297 A | 6/1989 | Landino et al. |
| 4,878,528 A | 11/1989 | Kobayashi |
| 4,884,618 A | 12/1989 | Steeves |
| 4,885,948 A | 12/1989 | Thrasher, Jr. et al. |
| 5,010,940 A | 4/1991 | Marocco |
| 5,044,417 A | 9/1991 | Bresson |
| 5,105,871 A | 4/1992 | Baud et al. |
| 5,167,269 A | 12/1992 | Abo |
| 5,274,499 A | 12/1993 | Shopp |
| 5,287,029 A | 2/1994 | Krouse |
| 5,437,324 A | 8/1995 | Sternquist |
| 5,460,216 A | 10/1995 | Hirao et al. |
| 5,467,266 A | 11/1995 | Jacobs et al. |
| 5,495,153 A | 2/1996 | Domel et al. |
| 5,515,898 A | 5/1996 | Alcocer |
| 5,517,094 A | 5/1996 | Domel et al. |
| 5,671,387 A | 9/1997 | Jacobs et al. |
| 5,760,558 A | 6/1998 | Popat |
| 5,772,274 A | 6/1998 | Tokarz |
| 5,786,647 A | 7/1998 | Vollmer et al. |
| 5,793,174 A | 8/1998 | Kovach et al. |
| 5,799,716 A | 9/1998 | Yamaguchi et al. |
| 5,803,150 A | 9/1998 | Bioteau |
| 5,975,185 A | 11/1999 | Miller et al. |
| 6,064,165 A | 5/2000 | Biosvert et al. |
| 6,111,694 A | 8/2000 | Shopp |
| 6,230,785 B1 | 5/2001 | Tokuyama et al. |
| 6,328,274 B1 | 12/2001 | Hayashi |
| 6,378,594 B1 | 4/2002 | Yamanaka et al. |
| 6,487,267 B1 | 11/2002 | Wolter |
| 6,536,503 B1 | 3/2003 | Anderson et al. |
| 6,630,758 B2 | 10/2003 | Aoki et al. |
| 6,685,592 B2 | 2/2004 | Fraczek et al. |
| 6,759,817 B2 | 7/2004 | Mersch |
| 6,979,962 B2 | 12/2005 | Cavarec et al. |
| 7,195,052 B2 | 3/2007 | Nien et al. |
| 7,237,592 B2 | 7/2007 | Amoux et al. |
| 7,389,806 B2 | 6/2008 | Kates |
| 7,407,040 B2 | 8/2008 | Doran |
| 7,723,939 B2 | 5/2010 | Carmen, Jr. |
| 7,726,379 B2 | 6/2010 | Beau |
| 7,967,051 B2 | 6/2011 | Diaz |
| 8,193,742 B2 | 6/2012 | Skinner et al. |
| 8,205,657 B2 | 6/2012 | Bohlen |
| 8,258,993 B2 | 9/2012 | Inoue et al. |
| 8,299,734 B2 | 10/2012 | Mullet et al. |
| 8,307,878 B2 | 11/2012 | Faller et al. |
| 8,368,328 B2 | 2/2013 | Mullet et al. |
| 8,461,784 B2 | 6/2013 | Skinner et al. |
| 8,575,872 B2 | 11/2013 | Mullet et al. |
| 8,659,246 B2 | 2/2014 | Mullet et al. |
| 8,723,454 B2 | 5/2014 | Skinner et al. |
| 8,776,861 B2 | 7/2014 | Bohlen et al. |
| 8,791,658 B2 | 7/2014 | Mullet et al. |
| 8,947,027 B2 | 2/2015 | Mullet et al. |
| 9,018,868 B2 | 4/2015 | Lucas et al. |
| 9,152,032 B2 | 10/2015 | Mullet et al. |
| 9,194,179 B2 | 11/2015 | Mullet et al. |
| 9,249,623 B2 | 2/2016 | Mullet et al. |
| 9,376,862 B2 | 6/2016 | Mullet et al. |
| 9,376,863 B2 | 6/2016 | Mullet et al. |
| 9,394,743 B2 | 7/2016 | Mullet et al. |
| 9,410,369 B2 | 8/2016 | Mullet et al. |
| 9,410,371 B2 | 8/2016 | Faller et al. |
| 9,611,690 B2 | 4/2017 | Mullet et al. |
| 9,725,948 B2 | 8/2017 | Mullet et al. |
| 9,725,952 B2 | 8/2017 | Mullet et al. |
| 9,745,797 B2 | 8/2017 | Mullet et al. |
| 9,771,755 B2 | 9/2017 | Mullet et al. |
| 9,890,585 B2 | 2/2018 | Mullet et al. |
| 9,896,882 B2 | 2/2018 | Mullet et al. |
| 10,246,938 B2 | 4/2019 | Mullet et al. |
| 2001/0050538 A1 | 12/2001 | Kovach et al. |
| 2002/0190678 A1 | 12/2002 | Huber et al. |
| 2003/0000657 A1 | 1/2003 | Dupielet et al. |
| 2004/0226669 A1 | 11/2004 | Webb |
| 2005/0126723 A1 | 6/2005 | Amoux et al. |
| 2007/0191126 A1 | 8/2007 | Mandracken |
| 2008/0044790 A1 | 2/2008 | Fani et al. |
| 2008/0060771 A1 | 3/2008 | Sugiyama et al. |
| 2008/0126723 A1 | 5/2008 | Ashton et al. |
| 2009/0059574 A1 | 3/2009 | Lewis et al. |
| 2010/0018654 A1 | 1/2010 | Skinner et al. |
| 2010/0175838 A1 | 7/2010 | Faller et al. |
| 2010/0269988 A1 | 10/2010 | Mullet et al. |
| 2011/0024064 A1 | 2/2011 | Ng |
| 2011/0048655 A1 | 3/2011 | Andreasen et al. |
| 2011/0265958 A1 * | 11/2011 | Skinner ............ E06B 9/322 160/127 |
| 2011/0297334 A1 | 12/2011 | Bohlen et al. |
| 2012/0234504 A1 | 9/2012 | Skinner et al. |
| 2013/0068404 A1 | 3/2013 | Faller et al. |
| 2013/0269887 A1 | 10/2013 | Skinner et al. |

(56) References Cited

U.S. PATENT DOCUMENTS

| | | |
|---|---|---|
| 2015/0034259 A1 | 2/2015 | Bohlen et al. |
| 2016/0138333 A2 | 5/2016 | Bohlen et al. |

FOREIGN PATENT DOCUMENTS

| | | |
|---|---|---|
| CN | 2203571 | 7/1995 |
| CN | 2490940 | 5/2002 |
| CN | 2639497 | 9/2004 |
| CN | 1643231 | 7/2005 |
| DE | 4211940 | 10/1993 |
| DE | 19935729 | 2/2001 |
| EP | 0651127 | 5/1995 |
| EP | 1947288 | 7/2008 |
| EP | 2256284 | 12/2010 |
| FR | 403577 | 11/1909 |
| GB | 1409891 | 10/1975 |
| GB | 2166480 | 5/1986 |
| JP | 5785482 | 5/1982 |
| JP | 2001040966 | 2/2001 |
| JP | 2002235488 | 8/2002 |
| TW | 514152 | 12/2002 |
| WO | 01/77479 | 10/2001 |
| WO | 2005/085578 | 9/2005 |
| WO | 2005/090736 | 9/2005 |
| WO | 2005/121487 | 12/2005 |
| WO | 2006/046103 | 5/2006 |
| WO | 2008/075494 | 6/2008 |
| WO | 2008/141389 | 11/2008 |
| WO | 2010/089118 | 8/2010 |
| WO | 2011/008267 | 1/2011 |
| WO | 2011106397 | 9/2011 |
| WO | 2011106398 | 9/2011 |
| WO | 2013059037 | 4/2013 |
| WO | 2014062504 | 4/2014 |
| WO | 2014169173 | 10/2014 |

OTHER PUBLICATIONS

United States Patent and Trademark Office, "Notice of Allowance," issued in connection with U.S. Appl. No. 15/231,163, dated Nov. 15, 2017, 5 pages.

United States Patent and Trademark Office, "Non-Final Office Action," issued in connection with U.S. Appl. No. 13/675,539, dated Aug. 29, 2013, 12 pages.

United States Patent and Trademark Office, "Final Office Action," issued in connection with U.S. Appl. No. 13/675,539, dated Feb. 24, 2014, 9 pages.

United States Patent and Trademark Office, "Non-Final Office Action," issued in connection with U.S. Appl. No. 13/675,539, dated Jul. 16, 2014, 6 pages.

United States Patent and Trademark Office, "Final Office Action," issued in connection with U.S. Appl. No. 13/675,539, dated Feb. 9, 2015, 9 pages.

United States Patent and Trademark Office, "Non-Final Office Action," issued in connection with U.S. Appl. No. 13/675,539, dated Jun. 1, 2015, 6 pages.

United States Patent and Trademark Office, "Final Office Action," issued in connection with U.S. Appl. No. 13/675,539, dated Nov. 2, 2015, 16 pages.

United States Patent and Trademark Office, "Advisory Action," issued in connection with U.S. Appl. No. 13/675,539, dated Jan. 25, 2016, 6 pages.

United States Patent and Trademark Office, "Advisory Action," issued in connection with U.S. Appl. No. 13/675,539, dated Apr. 20, 2015, 4 pages.

United States Patent and Trademark Office, "Notice of Allowance," issued in connection with U.S. Appl. No. 13/675,539, dated Apr. 12, 2016, 7 pages.

United States Patent and Trademark Office, "Non-Final Office Action," issued in connection with U.S. Appl. No. 12/685,927, dated Nov. 3, 2011, 9 pages.

United States Patent and Trademark Office, "Non-Final Office Action," issued in connection with U.S. Appl. No. 12/685,927, dated Mar. 8, 2012, 6 pages.

United States Patent and Trademark Office, "Notice of Allowance," issued in connection with U.S. Appl. No. 12/685,927, dated Jul. 5, 2012, 5 pages.

United States Patent and Trademark Office, "Notice of Allowance," issued in connection with U.S. Appl. No. 12/685,927, dated Oct. 16, 2012, 2 pages.

* cited by examiner

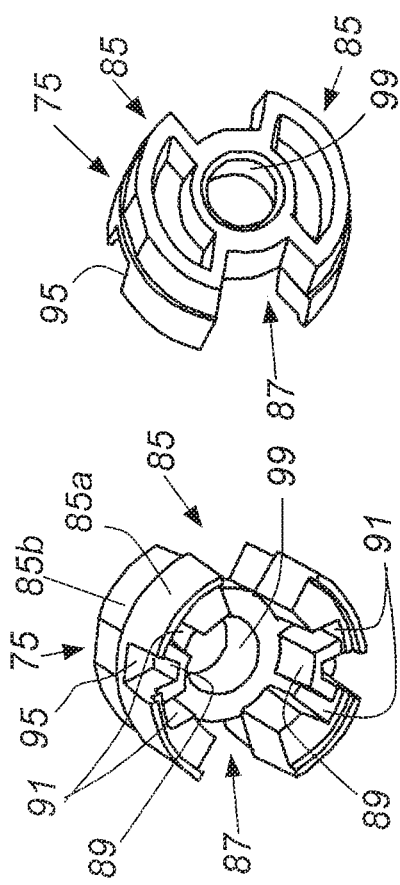
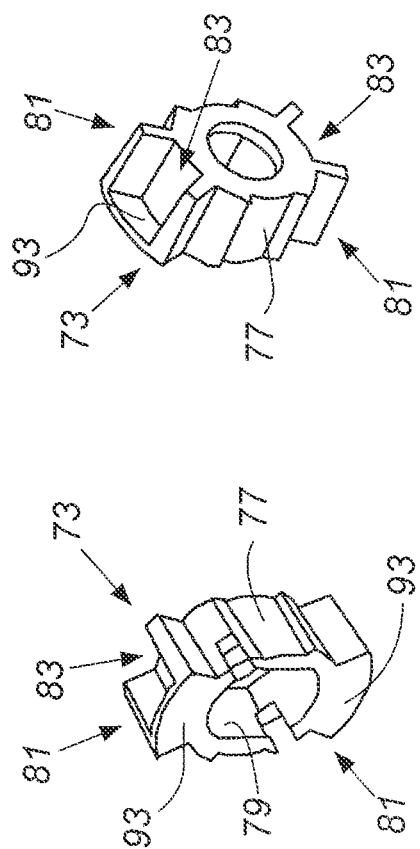
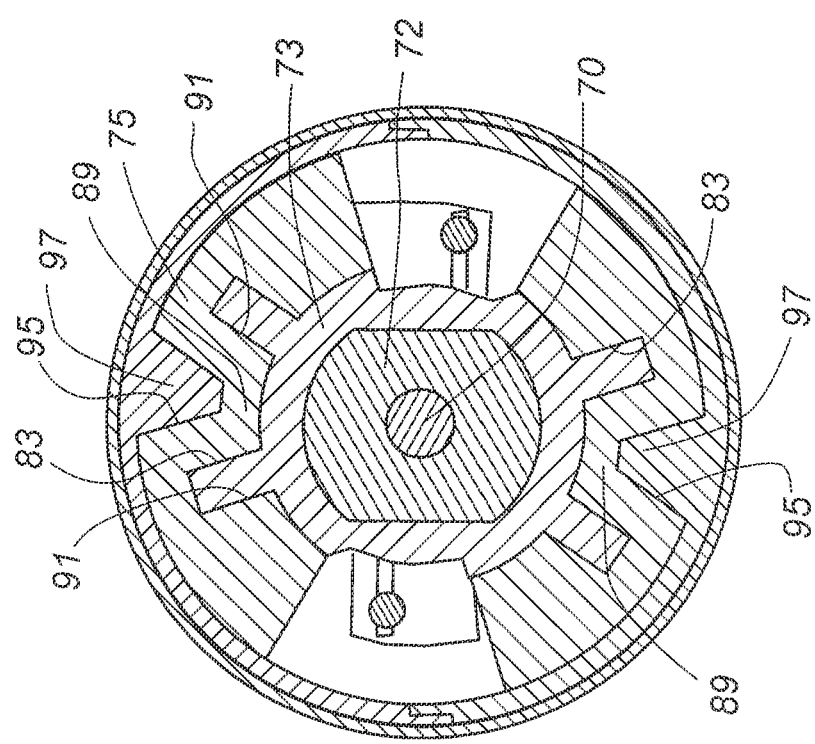

NOISE DAMPENING MOTOR DRIVE SYSTEM FOR RETRACTABLE COVERING FOR ARCHITECTURAL OPENINGS

CROSS-REFERENCE TO RELATED APPLICATIONS

The patent arises from a continuation of U.S. patent application Ser. No. 15/231,163, titled "Noise-Dampening Motor Drive System For Retractable Covering For Architectural Openings," and filed on Aug. 8, 2016, which is a continuation of U.S. patent application Ser. No. 13/675,539 (now U.S. Pat. No. 9,410,371), titled "Noise-Dampening Motor Drive System For Retractable Covering For Architectural Openings," and filed on Nov. 13, 2012, which is a continuation of U.S. patent application Ser. No. 12/685,927 (now U.S. Pat. No. 8,307,878), titled "Noise-Dampening Motor Drive System For Retractable Covering For Architectural Openings," and filed on Jan. 12, 2010, which claims benefit under 35 U.S.C. § 119(e) to U.S. Provisional Patent Application No. 61/144,467, titled "Noise-Dampening Motor Drive System For Retractable Covering For Architectural Openings," and filed on Jan. 14, 2009. U.S. patent application Ser. No. 15/231,163; U.S. patent application Ser. No. 13/675,539; U.S. patent application Ser. No. 12/685,927; and U.S. Provisional Patent Application No. 61/144,467 are all hereby incorporated by this reference into the present application in their entireties.

BACKGROUND OF THE INVENTION

Field of the Invention

The present invention is directed to motorized retractable coverings for architectural openings and more particularly to a system for minimizing noise created when an electric motor is used to reversibly drive a roller about which a fabric for the covering can be wrapped and unwrapped.

Description of the Relevant Art

Coverings for architectural openings such as windows, doors, archways, and the like, have assumed numerous forms for many years. Many such coverings are retractable and have a headrail in which a rotatable roller is horizontally disposed and supports a flexible fabric that depends from the roller. Depending upon the direction of rotation of the roller, the fabric is either wrapped or unwrapped from the roller. The roller can be rotated with a control system that might be manual using control cords or the like or might be motor driven and operable from a remote location particularly where the architectural opening is not easily accessible.

Motor driven coverings for architectural openings have previously been louder in operation than desirable. Accordingly, attempts have been made to reduce the noise which is typically vibratory in its source.

For example, the drive shaft from the motor or its gear-reduction unit typically carries a drive disk. The drive disk is operatively engaged with the roller in the headrail of the covering to rotate the roller in one direction or the other. The connection between the drive shaft and the drive disk has been made of a soft material to reduce the vibration that might otherwise be transferred from the drive shaft of the motor to the drive disk.

The present invention has been developed to further minimize the noise created in a motor-driven covering for an architectural opening.

SUMMARY OF THE INVENTION

Pursuant to the present invention, a covering for an architectural opening includes a headrail in which a reversibly rotatable roller is horizontally mounted. The roller supports the top edge of a flexible fabric material that can be wrapped around or unwrapped from the roller depending upon the direction of rotation of the roller.

The roller is reversibly rotated by an electric drive system that includes an electric motor and a gear-reduction unit mounted within a housing so as to be horizontally positioned within the roller. A drive shaft emanating from the motor/gear-reduction unit operatively carries a drive disk that is engaged with the roller to rotate the roller in reversible directions. The housing for the motor is rigidly supported on the headrail to resist torque applied thereto by resistance to rotation of the roller.

In order to dampen vibrations that naturally occur when an electric motor rotationally drives a relatively heavy roller and suspended fabric, resilient grommets are positioned within the housing at opposite ends of the motor and its gear-reduction unit with the grommets being slightly larger in diameter than the motor and gear-reduction unit so as to engage an inner wall of the housing and maintain a small separation of the housing from the motor and gear reduction unit. The drive disk operatively connected to the drive shaft from the motor is also made of a relatively soft material which dampens vibration but is firm enough to transfer torque from the drive shaft to the roller whereby the decibel level emanating from vibration of the drive unit when the motor is driven is maintained at an acceptable level.

Other aspects, features and details of the present invention can be more completely understood by reference to the following detailed description of a preferred embodiment, taken in conjunction with the drawings and from the appended claims.

BRIEF DESCRIPTION OF THE DRAWINGS

FIG. 10 is a section taken along line 10-10 of FIG. 6B.

FIG. 11 is an isometric looking at one side of the outer component of the rear motor mount.

FIG. 12 is an isometric looking at the other side of the outer component of the rear motor mount.

FIG. 13 is an isometric looking at one side of the inner component of the rear motor mount.

FIG. 14 is an isometric looking at the other side of the inner component of the rear motor mount.

DETAILED DESCRIPTION OF THE INVENTION

Figure 1:
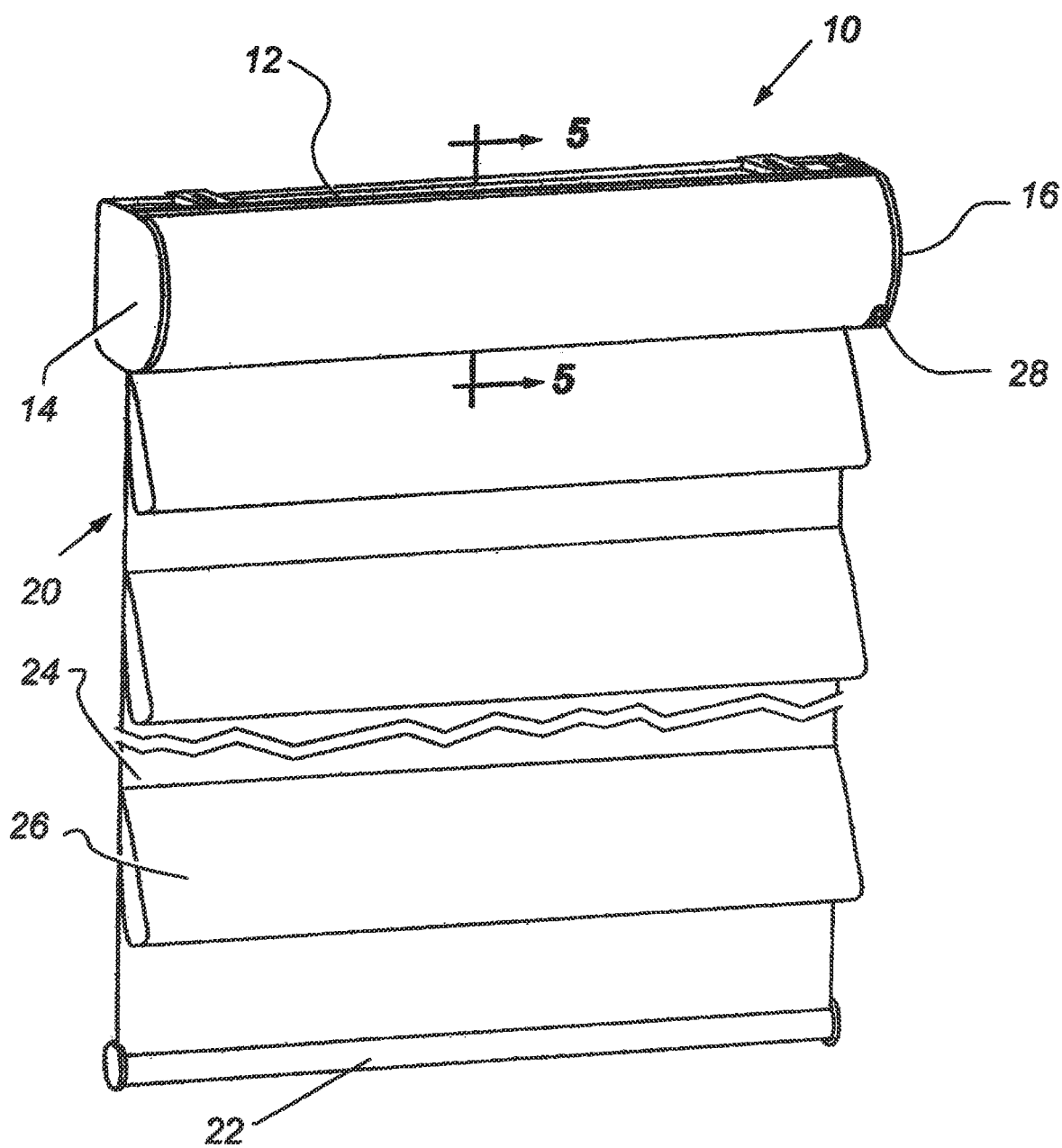
FIG. 1 is a fragmentary isometric of a motor-driven retractable covering for an architectural opening incorporating the motor-mounting system of the present invention.

Referring to FIG. 1, a covering 10 for an architectural opening is shown including a headrail 12 having end caps 14 and 16 at opposite ends of the headrail and with a roller 18 (FIG. 3B) interiorly of the headrail that is horizontally disposed and supports a top edge of a flexible fabric shade material 20 having a ballast 22 along the lower edge. The fabric material can be any flexible material adapted to be rolled around a roller, but the material illustrated has a backing sheet 24 to which is attached a plurality of horizontally disposed vertically spaced loops of material 26 simulating a Roman shade. At the right end of the headrail (even though it could be anywhere along the length of the headrail), a remote sensor 28, which might be RF or IR for operating a reversible motor 30 (FIG. 4) carried within the headrail from a remote location, is seen incorporated into the headrail.

Figure 2:
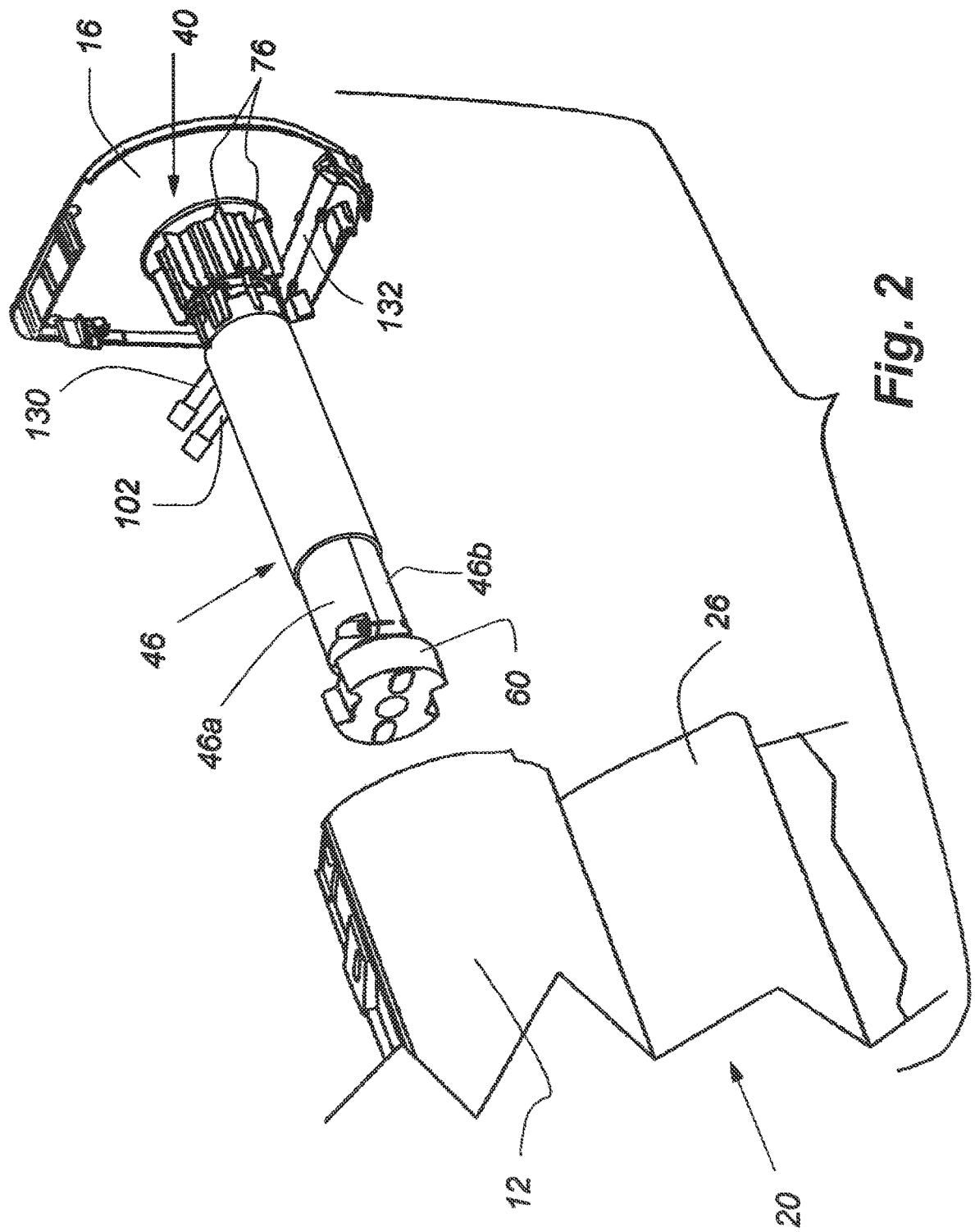
FIG. 2 is an exploded fragmentary isometric showing the end of the headrail with the motor-drive unit mounted thereto.
Figure 3A:
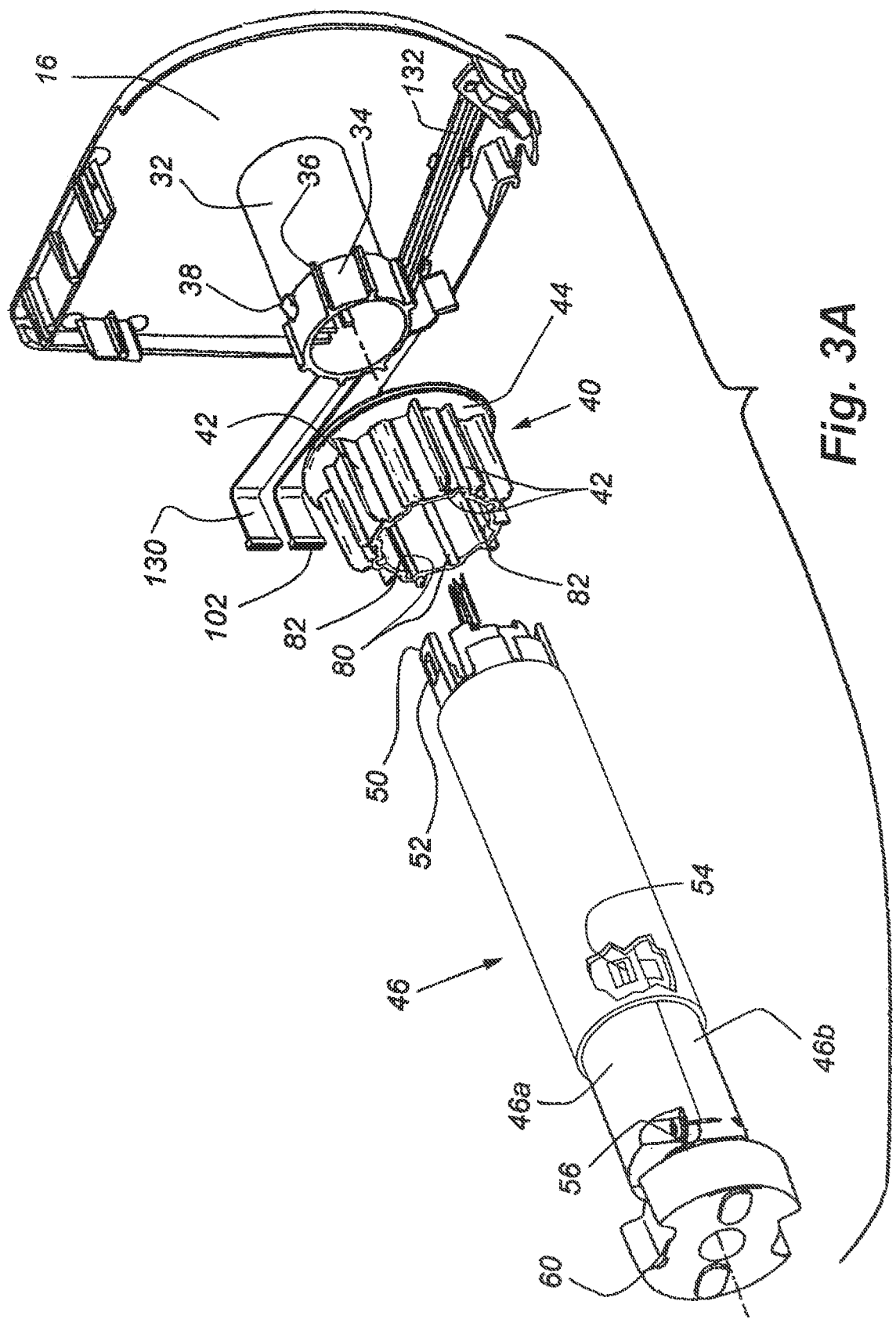
FIG. 3A is a view similar to FIG. 2 with the motor-drive unit itself further exploded.

FIG. 2 shows the drive system for the present invention which is mounted on the end cap 16 at the right end of the headrail as seen in FIG. 1 with the end cap having an inwardly directed mounting shaft 32 seen in FIG. 3A with a mounting ring 34 on its distal end. The mounting ring has a plurality of radiating longitudinally extending fins 36 and diametrically opposed catch tabs 38 which are beveled for a purpose to be described hereafter. A mounting hub 40 with longitudinally-extending radiating ribs 42 and an end plate 44 is rotatably seated on the mounting shaft for a purpose to be described hereafter.

Figure 6A:
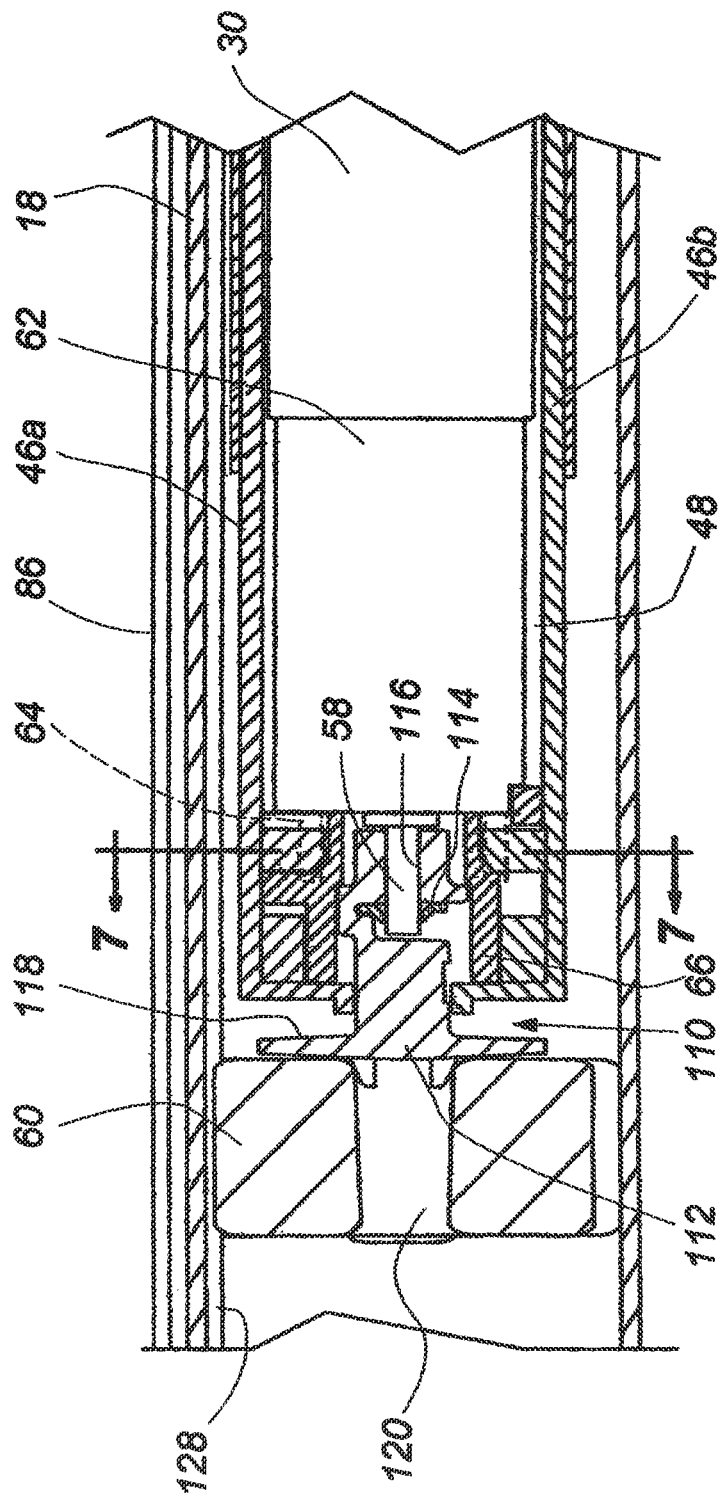
FIG. 6A is a section taken along line 6A-6A of FIG. 5.

The drive unit, as seen in FIG. 3A, includes a two-piece housing 46 having identical components 46a and 46b which might be made of a slightly flexible but substantially rigid plastic material that when assembled is substantially cylindrical in configuration and defines an internal cylindrical cavity 48 (FIG. 6A). The end of the housing adjacent to the right end cap 16 has diametrically opposed longitudinally extending flexible arms 50 having rectangular holes 52 therethrough that can be slid over the beveled catch tabs 38 until the tabs project into the holes of the flexible arms so that the housing 46 is releasably secured to the mounting ring 34 and prevented from rotation by receipt of the catch tabs in the holes of the flexible arms. Releasable catches 54 are also provided in surfaces of the two components 46a and 46b of the housing and fasteners 56 can further be used to positively secure the two components of the housing together.

Projecting from the distal end of the housing 46 is a drive shaft 58 (FIG. 4) which is operatively connected to a drive disk or coupler 60 which is reversibly rotatable by the reversible motor 30 and a gear-reduction unit 62 of which the drive shaft forms a part. The motor/gear-reduction unit is positioned horizontally within the housing as possibly seen best in FIG. 4 with the reversible motor being axially aligned with the gear-reduction unit. The drive shaft 58 can be seen to be of non-circular cross-section. Three longitudinally-extending pins 64 are also circumferentially spaced around the drive shaft at the distal end of the gear-reduction unit with the pins serving a function to be described hereafter.

Figure 4:
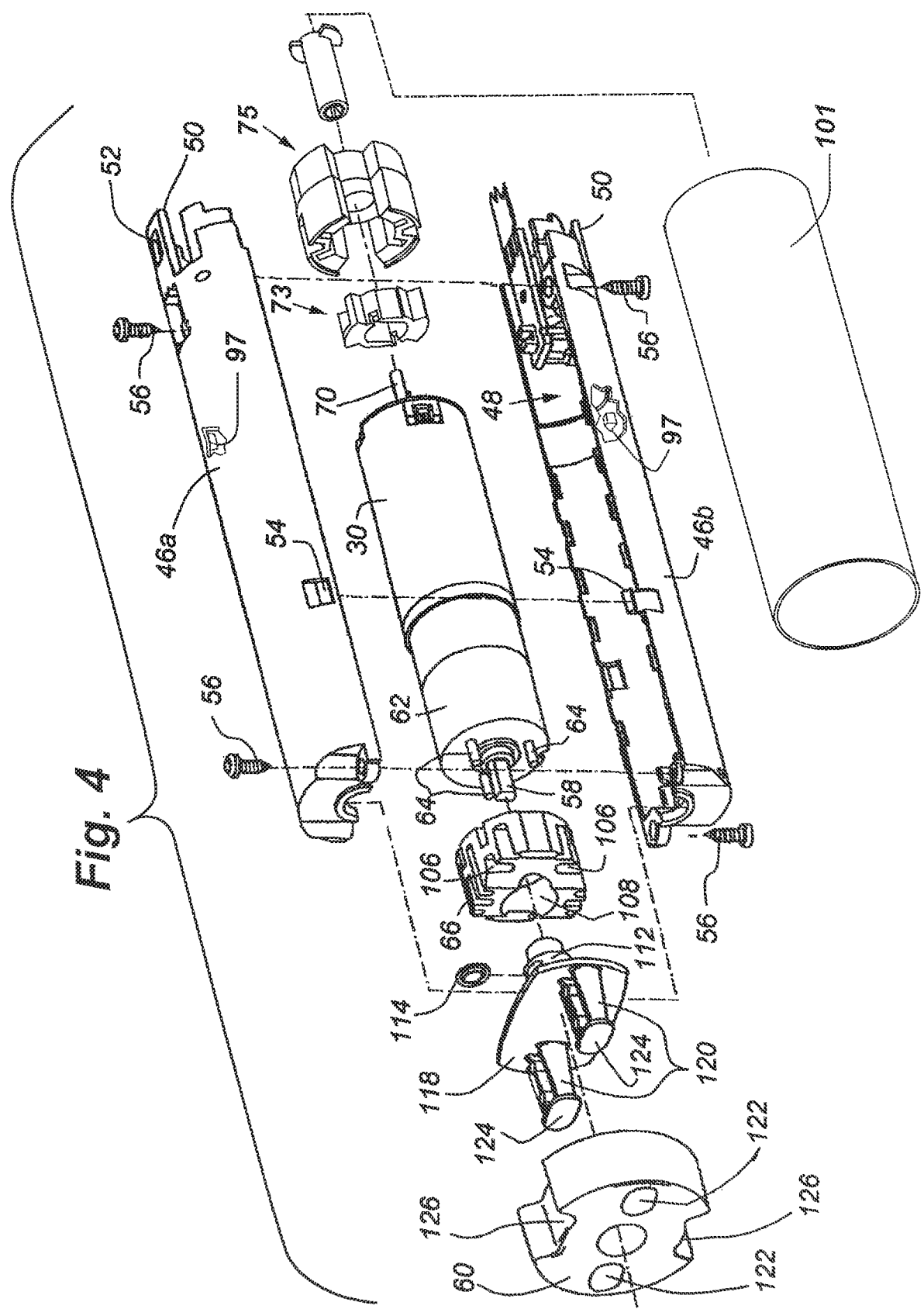
FIG. 4 is an exploded isometric of the drive unit.
Figure 5:
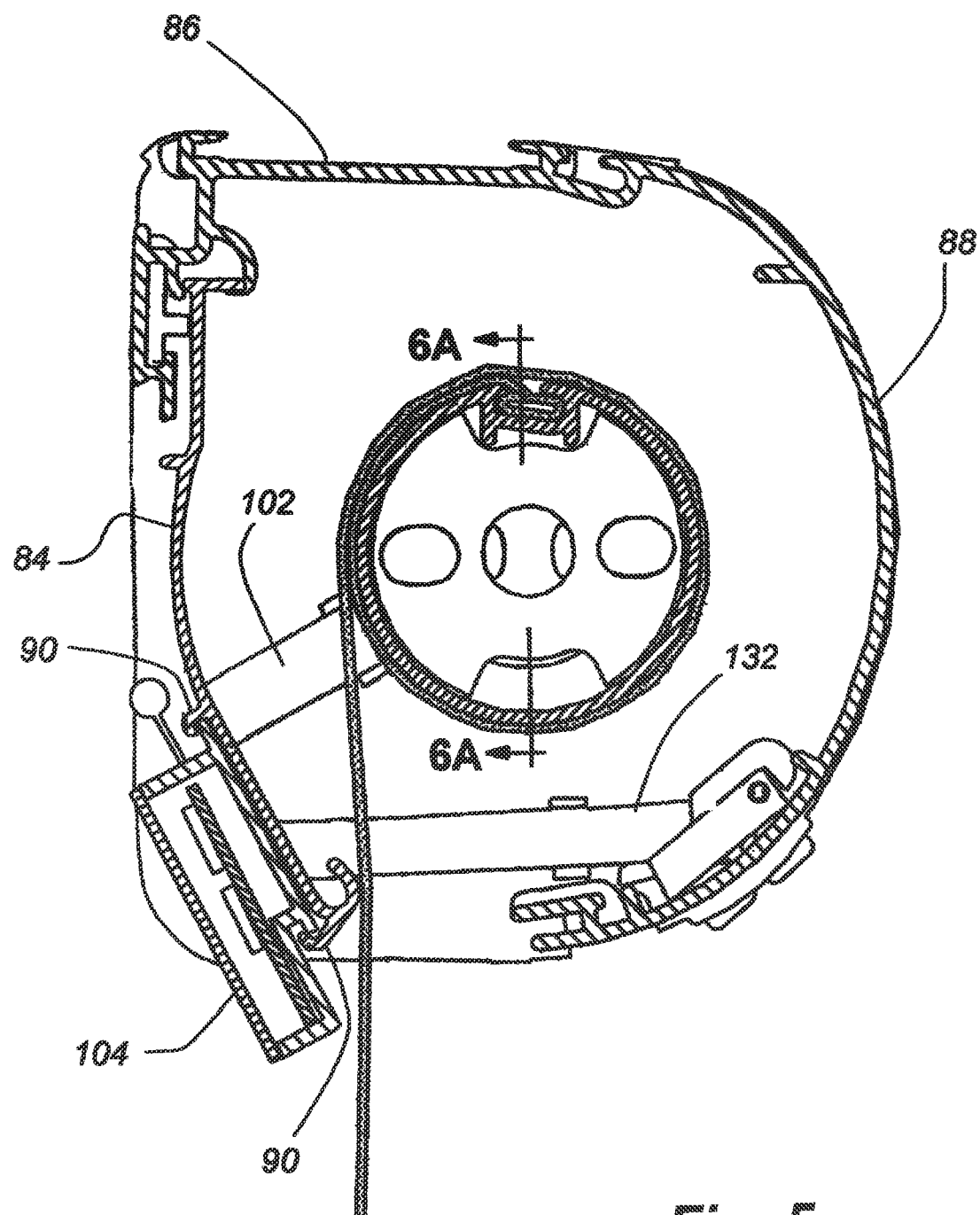
FIG. 5 is an enlarged section taken along line 5-5 of FIG. 1.
Figure 6B:
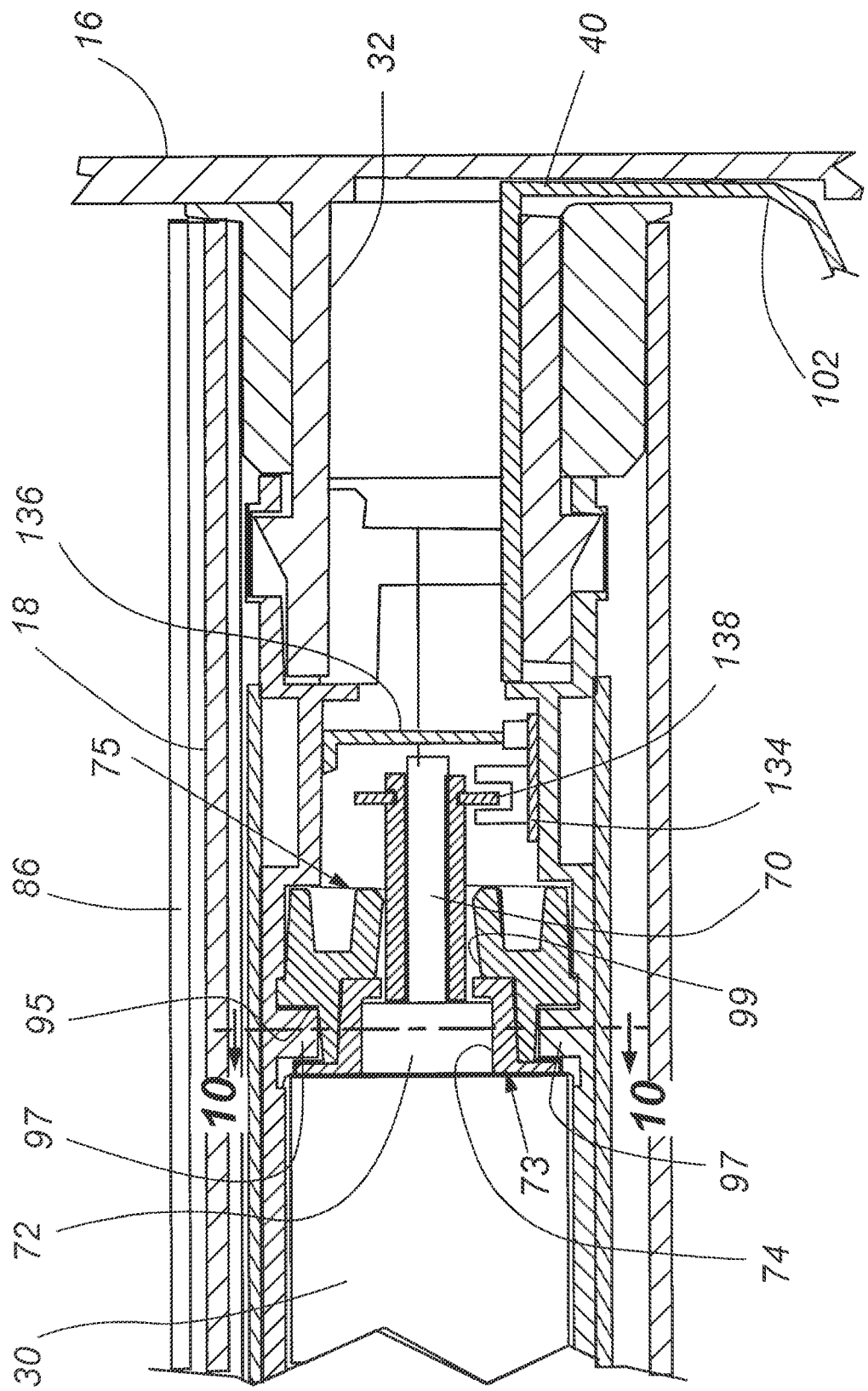
FIG. 6B is a longitudinal vertical section through the roll bar showing the electrical connection of a drive module to the motor and battery pack.

At opposite ends of the motor/gear-reduction unit 30/62, as best seen in FIGS. 4, 6A and 6B, front 66 and rear 68 motor mounts or bushings are provided. The front motor mount or bushing is made of a resilient material that is relatively soft in comparison to the motor/gear-reduction unit and further is of generally circular transverse cross-section with the diameter of the cross-section being slightly greater than the diameter of the motor/gear-reduction unit. The outer diameter of the front motor mount is substantially commensurate with the diameter of the internal cylindrical cavity 48 of the housing 46 when it is assembled so that the housing circumferentially engages the resilient front motor mount and is thereby maintained in a slightly spaced relationship from the motor/gear-reduction unit. The front motor mount preferably has a durometer rating in the range of 50A to 70A with a preferred rating of 64A.

A motor rotated timing pin 70 extends axially from the opposite or rear end of the motor/gear-reduction unit 30/62 from the drive shaft 58 and passes through the rear motor mount 68. The motor/gear-reduction unit has an axial substantially oblong, non-circular extension 72 supported in the rear motor mount so that the motor/gear-reduction unit is supported at this end by the rear motor mount and at the opposite end by the three circumferentially spaced longitudinally extending pins 64, which support the front motor mount 66.

The rear motor mount 68 is a two-piece motor mount having an internal hard and rigid component 73 and an external relatively soft component 75. The hard component includes a main body 77 having a substantially ovular or otherwise non-circular recess 79 in a front surface thereof which correlates in size and cross-sectional shape to the axial extension 72. At the top and bottom of the main body are identical diametrically opposed fingers 81 of generally trapezoidal cross-section having a rearwardly opening seat 83 also of generally trapezoidal cross section adapted to receive and be keyed to the relatively soft component of the rear motor mount as will be described hereafter. The hard component is thereby received on the non-circular axial extension 72 of the motor/gear-reduction unit so that it is nonrotatable relative thereto.

The relatively soft component 75 of the rear motor mount 68 is one piece having an outer partially segmented substantially cylindrical wall 85 with the segments of the wall being diametrically opposed and forming a gap 87 therebetween adapted to slidably receive the hard component 73. In order to key the hard inner component to the relatively soft outer component, each segment of the outer component has an inwardly directed rib 89 of substantially trapezoidal transverse cross-section, which defines a generally V-shaped slot 91 on opposite sides of the rib so that the rib can be received in a corresponding rearwardly opening seat 83 of the hard inner component. In this manner, the hard component can be slid into the open left end of the outer component until a plate 93 at the end of each substantially trapezoidal seat engages the end of the outer component which positively positions the hard component relative to and within the outer component. As can also be appreciated, the relatively soft outer component also has a longitudinally-extending groove 95 in the top and bottom surface with those grooves receiving inwardly directed lugs 97 (FIGS. 4, 6B and 10) formed on the inner surface along the longitudinal top and bottom center of the upper and lower housing components 46a and 46b respectively so that when the outer component of the rear motor mount is seated within the housing 46, the entire rear motor mount is prevented from rotating relative to the motor/gear-reduction unit. The outer segmented cylindrical wall 85 of the outer component is also divided into two axially related half segments 85*a* and 85*b* with the rear segment 85*b* being of slightly smaller diameter than the front segment to assist in mounting the rear motor mount within the housing 46. A passage 99 also extends through the rear segment to receive the shaft 70 of the motor/gear-reduction unit.

As mentioned, the inner component 73 is rigid and hard and can be made of plastic or metal. The outer relatively soft component 75 would preferably be of a plastic material having a durometer rating in the range of 30A to 50A with the most preferable durometer rating being 38A. Having the relatively hard component fitted within and cooperating with the relatively soft outer component, a resistance to rotation of the motor relative to the housing 46 is obtained while still absorbing any vibration, which create noise in operation of the motor.

It has also been found that static electricity will build up when the shade material 20 of a covering 10 incorporating the present invention passes into and out of the headrail 12 for the covering. That static electricity can adversely effect the operation of the motor 30. To shield or insulate the motor from any such static electricity, a sleeve 101 (FIG. 4) made of a flexible heat-shrink plastic material is shrunk around the housing 46 for the motor/gear-reduction unit 30/62 which provides a static electricity barrier to prevent malfunctioning of the motor.

The hub 40 (FIG. 3A) consists generally of a cylindrical body having the longitudinally-extending circumferentially spaced ribs 42 and the end plate 44 at the proximal end thereof. The hub also has longitudinally-extending and radially inwardly directed grooves 80 which slidably receive the fins 36 of the mounting ring 34 as the hub is advanced past the mounting ring into a seated position on the mounting shaft 32 where it is free to rotate. The hub further includes inwardly directed longitudinally-extending grooves 82 adapted to slidably receive the catch tabs 38 of the mounting ring so the hub can be slid over and past the mounting ring.

It will therefore be appreciated that the mounting shaft 32 and mounting ring 34 are rigidly mounted on the end cap 16 with the hub 40 being rotatably mounted on the mounting shaft. The housing 46 is mounted on the mounting ring and secured thereto with the locking engagement of the flexible arms 50 with the catch tabs 38. The housing, therefore, projects axially along the length of the headrail 12 so that the drive disk 60 at the distal end of the housing and the housing itself are positioned for receipt within the roller 18 as will be described hereafter with the drive disk being operatively engaged with the roller in supporting relationship to effect reversible rotation thereof via energy provided by the motor 30. The opposite or left end of the roller is rotatably supported on the left end cap 14 in a conventional manner, which is not illustrated.

Figure 3B:
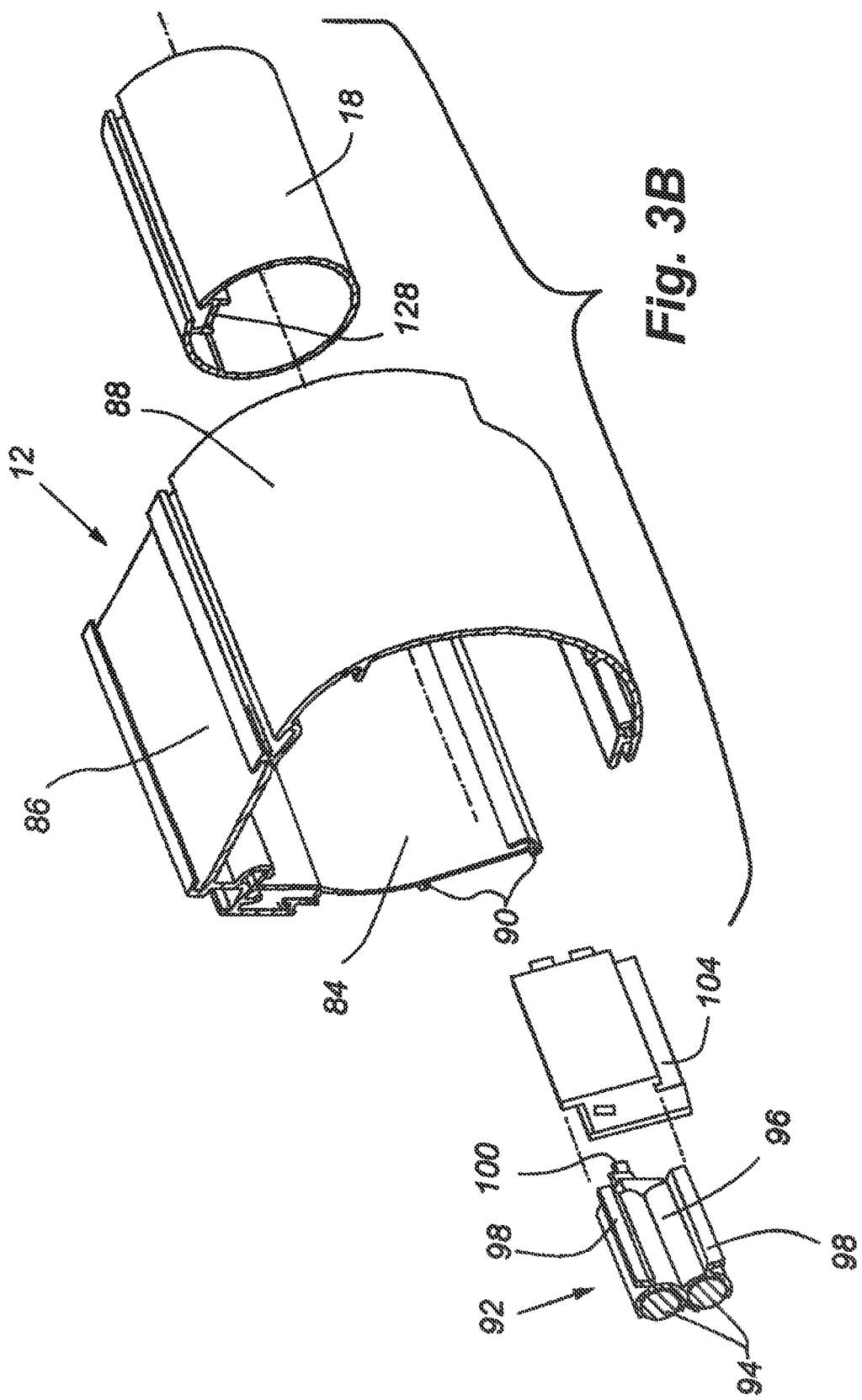
FIG. 3B is a fragmentary isometric showing a portion of the headrail, the roller, and battery pack for driving the motor.

The headrail 12, which is probably best viewed in FIG. 3B, has a relatively flat back wall 84, a flat top wall 86, and an arcuate front wall 88. The back wall has a pair of guide channels 90 each of L-shaped cross-section adapted to slidably receive and retain a battery pack 92 for providing energy to the motor 30. The battery pack includes a pair of longitudinally-extending batteries 94 that are supported on a bracket 96 having guide arms 98 for slidable receipt in the channels 90 so that the battery pack can be slid into position and will remain in position on the rear wall of the headrail so as to be out of sight. At one end of the bracket 96, an electrical connector 100 protrudes from the battery pack and is adapted to receive an electrical connector on a flat wire conductor 102 seen for example in FIGS. 3A and 9, which is operatively connected to the motor in a manner to be described hereafter. A control module 104 is also slidably mounted on the back wall 84 of the headrail in the same manner as the battery pack as is probably seen best in FIG. 3B. The control module is operatively connected to other components of the covering for controlling its operation as will be explained later. It is of importance to note that control modules for remotely operable retractable coverings for architectural openings have typically been mounted inside a head rail adjacent to an end cap and in this position the width of the fabric had to be limited relative to the overall length of the head rail as the control module itself prevented positioning the edge of the fabric closely adjacent to the end cap. By mounting the control module on the back wall of the head rail as in the present invention, the width of the fabric can be made to be substantially commensurate with the length of the head rail as the lateral edges of the fabric can be positioned closely adjacent to the end caps. Making the width of the fabric substantially commensurate with the length of the head rail allows the fabric to cover a greater portion of the architectural opening than is otherwise permissible with a given length of head rail.

Referring again to FIG. 4, at the distal end of the motor/gear-reduction unit 30/62, the front motor mount 66, as mentioned previously, is positioned and has holes 106 in its proximal end adapted to receive the three longitudinally-extending circumferentially spaced pins 64. These holes can be seen, for example, in FIGS. 7 and 8 and become slightly ovular in cross-section (FIG. 8) when stretched so that the circular cross-section of the pins can move relative to the motor/gear-reduction unit in a circumferential direction a small amount within the holes. This helps to absorb vibration when the motor is energized or de-energized, as will become more clear hereafter.

The front motor mount 66 further includes a large centered axial passage 108 that receives an interconnect 110 as seen best possibly in FIG. 4 with the interconnect having a proximal shaft 112 extending through the front motor mount and being secured thereto with a snap ring 114. The proximal shaft has an axial hole 116 (FIG. 6A) that receives the non-circular drive shaft 58 of the motor/gear-reduction unit 30/62 with the transverse configuration of the drive shaft and the hole 116 being the same and in the disclosed embodiment of D-shape. In this manner, the rotation of the drive shaft is transferred to the interconnect. The interconnect further includes a flat abutment plate 118 adapted to abut against the proximal face of the drive disk 60 and a pair of forwardly and longitudinally extending support legs 120 that are receivable in diametrically opposed passages 122 through the drive disk. The support legs have an enlarged cap 124 on their end so that the resilient drive disk can be inserted onto the interconnect and retained in position. The drive disk further includes a pair of diametrically opposed radially opening grooves 126 of generally trapezoidal transverse cross-section with these grooves adapted to cooperate with the roller 18 as will be explained hereafter in transferring rotation from the motor drive shaft to the roller.

The interconnect 110 is preferably made of a material that is rigid enough to transfer torque from the drive shaft 58 to the drive disk 60. While some plastics would be suitable, metals have been found desirable with zinc being the preferred metal. As mentioned, the drive disk is made of a resilient and relatively soft material having a durometer rating preferably in the range of 55A to 65A so that there is enough rigidity in the disk to drive the roller while providing a cushioned interface between the drive shaft and the roller. Accordingly, through the soft drive disk vibrations of the relatively hard motor 30 and its drive shaft 58 are reduced significantly while the interconnect and drive disk have enough rigidity to acceptably transfer torque from the drive shaft to the roller.

The front 66 and rear 68 motor mounts are also made of resilient, relatively soft materials, as mentioned previously, with the durometer rating of the front motor mount being preferably in the range of 50A to 70A while the durometer rating of the outer portion of the rear motor mount is preferably in the range of 30A to 50A.

FIG. 6A is a longitudinal section through the roller 18 showing the motor/gear-reduction unit 30/62, the front motor mount 66, the interconnect 110, the drive disk 60, and the roller 18, which is operatively engaged with the drive disk. The roller, which is possibly best seen in FIG. 3B, is generally cylindrical in configuration having a radially inwardly directed longitudinally-extending projection 128 that is adapted to be received in one of the diametrically opposed grooves 126 in the drive disk. This assures a unitary rotation of the roller with the drive disk and with the motor.

Figure 7:
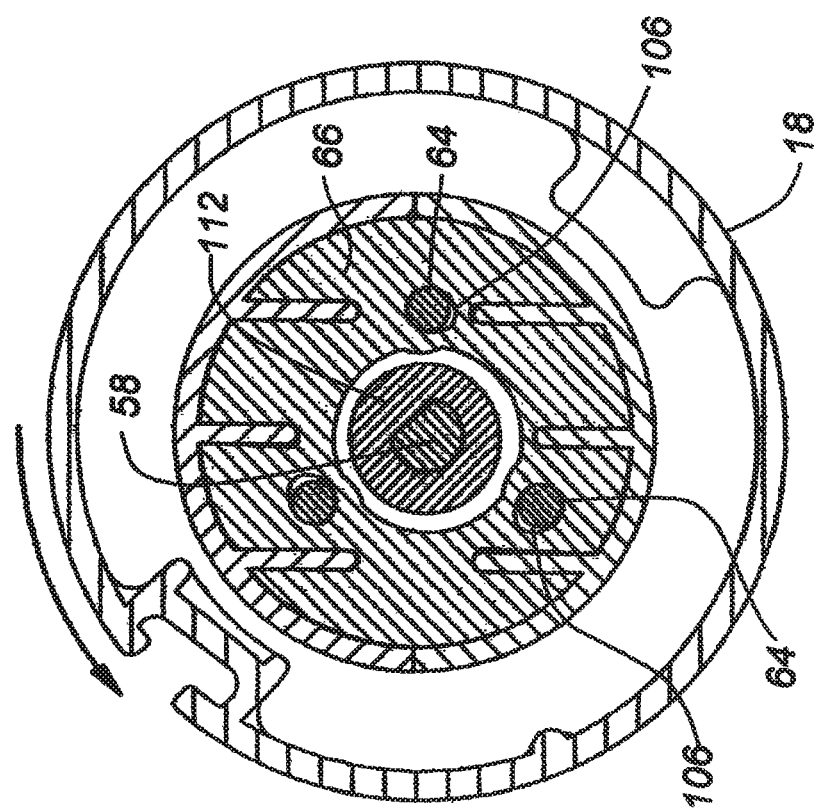
FIG. 7 is an enlarged section taken along line 7-7 of FIG. 6A.
Figure 8:
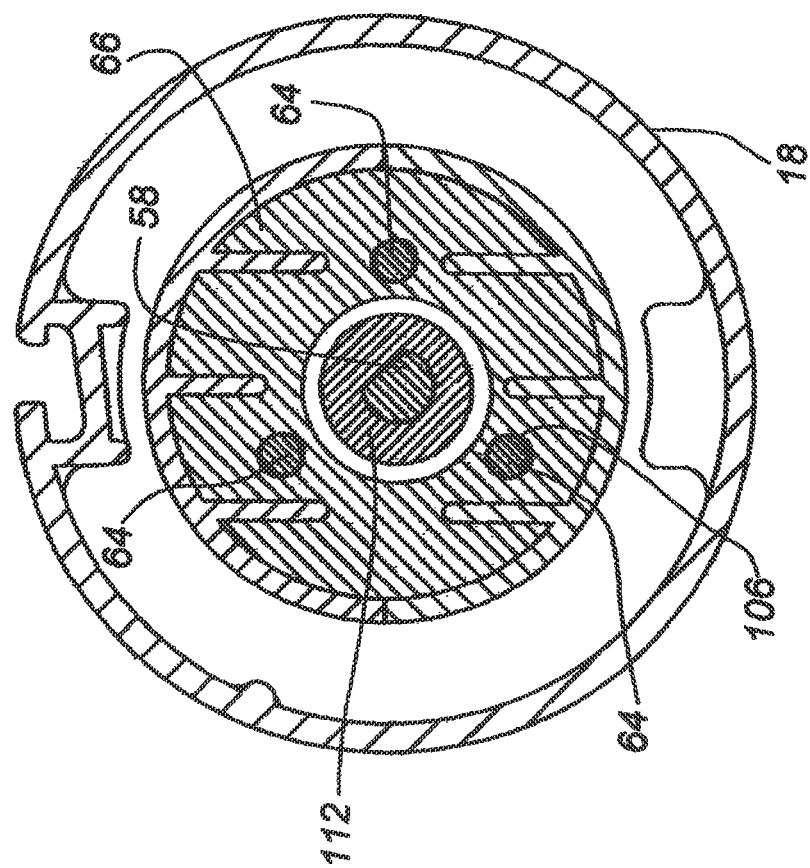
FIG. 8 is a section similar to FIG. 7 with the roll bar having been rotated slightly to show shock absorption features of the invention.

Referring again to FIGS. 7 and 8, as mentioned previously, the front motor mount 66 has the holes 106 for receiving the circumferentially spaced pins 64, which are circular in cross-section, and this relationship between the pins and the motor mount provide a system for absorbing vibration that might otherwise exist when the motor is energized and de-energized. FIG. 7 shows the pins in the holes when the motor is not being driven, and FIG. 8 shows the pins shifted to one side of the holes, which become distorted into an ovular shape when the motor is driven in one direction, and it can thereby be seen that that movement is absorbed and cushioned as the pins shift relative to the holes in which they are received.

Figure 9:
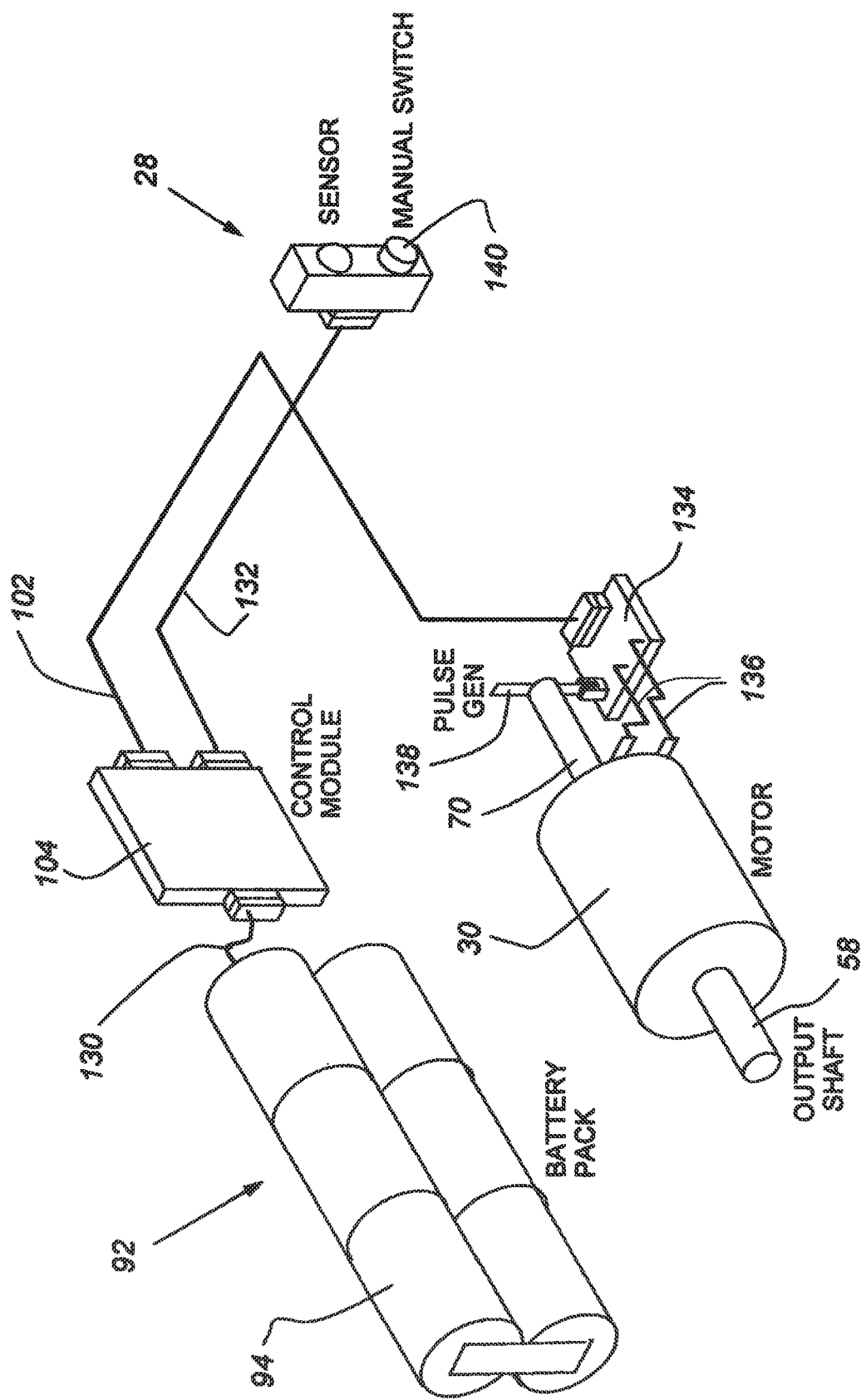
FIG. 9 is a diagrammatic of the electrical circuitry for the covering of FIG. 1.

The operation of the covering is best appreciated by reference to FIG. 9 where various components of the covering are shown diagrammatically along with their interconnection. It will first be appreciated that the battery pack 92 mounted on the back wall 84 of the headrail 12 is connected with a flat cable 130 to one end of the control module 104, which is also mounted on the back wall of the headrail. The control module on an opposite end is connected both to the remote sensor 28 by one flat cable 132 and to an electrical mounting plate 134 with the flat cable 102, which is also seen in FIG. 6B. The flat cable 102 going to the electrical mounting plate is electrically connected through the plate to a pair of electrical wires 136 connected to the motor 30 with one of those wires being seen in FIG. 6B. The electrical plate also interconnects the control module with a timing arm 138 mounted on the end of the rotatable timing pin 70, which rotates with the motor so that the timing arm intercepts a signal in a conventional manner to count rotations of the timing pin so that any covering having this operating system can be preset through its control module to extend or retract a predetermined amount to cover or uncover an architectural opening in which the covering is mounted depending upon the number of rotations of the timing pin. Such systems are commonly known in the art and, accordingly, a further description thereof is not deemed necessary.

With the control system as shown in FIG. 9, it will be appreciated that information received by the sensor 28, either from a remote control (not shown) or through a manual switch 140 provided on the remote sensor, can be transmitted to the control module 104 which is energized by the battery pack 92. That information is used to drive the motor 30 and its gear-reduction unit 62 in one direction or another, which not only rotates the roller 18 about which the fabric 20 for the covering is wrapped or unwrapped, but also counts the rotations of the roller so that the covering can be extended a predetermined amount from the roller to precisely cover the architectural opening in which the covering is mounted.

It will be appreciated from the above that the motor-drive system utilized in the covering of the present invention has been designed to minimize vibration that creates noise during operation of the electric motor. There are two distinct shock-absorbing components of the motor drive system with one of those components being the drive disk 60, and the other the front 66 and rear 68 motor mounts. Considerable effort has been given to arriving upon the most desirable durometer rating for these components of the system, as simply making the components harder for better torque transfer or softer for more sound absorption was found not to be the full answer. Rather, various durometer combinations for the components were determined to fall in the ranges mentioned previously, which generated a decibel output of approximately 58 decibels, which was a level found to be acceptable and superior to prior art systems.

Although the present invention has been described with a certain degree of particularity, it is understood the disclosure has been made by way of example, and changes in detail or structure may be made without departing from the spirit of the invention as defined in the appended claims.

What is claimed is:

1. An architectural covering comprising:
   a cylindrical housing having a cylindrical inner surface, a first opening in a first end of the cylindrical housing, and a second opening in a second end of the cylindrical housing opposite the first end;
   a motor disposed within the cylindrical housing, the motor including a drive shaft extending from a first axial end of the motor and an axial extension extending from a second axial end of the motor opposite the first axial end of the motor, a central axis of the motor extending through an area defined by a perimeter of the axial extension; and
   a motor mount coupled to the motor, the motor mount including a rigid component and a resilient component, the rigid component mounted on the axial extension, the resilient component mounted on the rigid component and engaged with the cylindrical inner surface of the cylindrical housing to absorb vibration during operation of the motor, the motor mount disposed between the first and second ends of the cylindrical housing such that the motor mount is confined within the cylindrical housing.

2. The architectural covering of claim 1, further including a roller to which a shade is coupled, the cylindrical housing disposed within the roller, the drive shaft operatively coupled to the roller to rotate the roller to extend or retract the shade.

3. The architectural covering of claim 1, wherein the resilient component has a lower durometer than the rigid component.

4. The architectural covering of claim 1, wherein the resilient component is separated from the second axial end of the motor and the axial extension by the rigid component.

5. The architectural covering of claim 1, wherein the motor mount is a first motor mount, further including a second motor mount disposed in the cylindrical housing between the first axial end of the motor and the first end of the cylindrical housing.

6. The architectural covering of claim 1, wherein:
   the rigid component is non-rotatably mounted on the axial extension; and the resilient component is non-rotatably mounted on the rigid component to non-rotatably couple the motor to the cylindrical housing.

7. A motor-drive unit comprising:
a housing having a first end and a second end opposite the first end;
a motor disposed within the housing, the motor including a drive shaft extending from a first axial end of the motor and an axial extension extending from a second axial end of the motor opposite the first axial end of the motor;
a motor mount coupled to the motor, the motor mount including a rigid component and a resilient component, the rigid component mounted on the axial extension, the resilient component mounted on the rigid component and engaged with an inner surface of the housing to absorb vibration during operation of the motor, the motor mount disposed between the first and second ends of the housing such that the motor mount is confined within the housing; and
a motor-rotated timing pin extending from the second axial end of the motor, the timing pin passing through the axial extension.

8. The motor-drive unit of claim 7, wherein the housing includes a first lug disposed on the inner surface of the housing and a second lug disposed on the inner surface of the housing, the first lug and the second lug spaced apart from the first end and the second end of the housing, and the resilient component includes a first groove that receives the first lug and a second groove that receives the second lug to inhibit relative rotation between the resilient component and the housing.

9. The motor-drive unit of claim 8, wherein the rigid component includes radially extending fingers that are received within corresponding slots in the resilient component, and wherein outer ends of the fingers are disposed further from a center of the motor mount than inner ends of the first and second lugs.

10. The motor-drive unit of claim 9, wherein the slots in the resilient component form ribs, and the fingers of the rigid component form seats that receive the corresponding ribs of the resilient component.

11. The motor-drive unit of claim 10, wherein the lugs are rotationally aligned with the seats.

12. The motor-drive unit of claim 7, wherein the rigid component is abutted against the second axial end of the motor.

13. The motor-drive unit of claim 12, wherein the resilient component is separated from the second axial end of the motor and the axial extension by the rigid component.

14. The motor-drive unit of claim 7, wherein the timing pin passes through and is rotatable relative to the motor mount.

15. The motor-drive unit of claim 14, wherein a distal end of the timing pin is confined within the housing and spaced apart from the second end of the housing.

16. The motor-drive unit of claim 7, further including a roller and a covering coupled to the roller, the drive shaft to rotate the roller to extend or retract the covering.

17. A motor-drive unit comprising:
a housing having a first end and a second end opposite the first end;
a motor disposed within the housing, the motor including a drive shaft extending from a first axial end of the motor and an axial extension extending from a second axial end of the motor opposite the first axial end of the motor;
a motor mount coupled to the motor, the motor mount including a rigid component and a resilient component, the rigid component mounted on the axial extension, the resilient component mounted on the rigid component and engaged with an inner surface of the housing to absorb vibration during operation of the motor, the motor mount disposed between the first and second ends of the housing such that the motor mount is confined within the housing;
a roller and a covering coupled to the roller, the drive shaft to rotate the roller to extend or retract the covering; and
a sleeve of heat-shrink material disposed around the housing to shield the motor from static electricity, the sleeve of heat-shrink material disposed between the housing and the roller.

18. A motor-drive unit comprising:
a housing;
a motor disposed within the housing, the motor including a drive shaft extending from a first axial end of the motor and an extension extending from a second axial end of the motor opposite the first axial end of the motor, the extension disposed along a central axis of the motor; and
a motor mount coupled to the motor, the motor mount including a rigid component and a resilient component, the rigid component mounted on the extension, the resilient component mounted on the rigid component and engaged with an inner surface of the housing to absorb vibration during operation of the motor, the resilient component separated from the second axial end of the motor by the rigid component.

19. A motor-drive unit comprising:
a housing;
a motor disposed within the housing, the motor including a drive shaft extending from a first axial end of the motor and an axial extension extending from a second axial end of the motor opposite the first axial end of the motor; and
a motor mount coupled to the motor, the motor mount including a rigid component and a resilient component, the rigid component mounted on the axial extension, the rigid component including a recess having a shape that matches the axial extension, the axial extension and the recess being non-circular shaped, the resilient component mounted on the rigid component and engaged with an inner surface of the housing to absorb vibration during operation of the motor, the resilient component separated from the second axial end of the motor by the rigid component.

20. The motor-drive unit of claim 18, wherein the motor is spaced from the housing by the resilient component of the motor mount.

* * * * *